Dec. 12, 1933.  J. J. NEUMAN  1,939,183
AUTOMATIC SEQUENCE CONTROL MEANS
Filed July 26, 1930  6 Sheets-Sheet 1

INVENTOR
Jacob J. Neuman
BY
his ATTORNEY

Dec. 12, 1933.  J. J. NEUMAN  1,939,183
AUTOMATIC SEQUENCE CONTROL MEANS
Filed July 26, 1930  6 Sheets-Sheet 2

INVENTOR
Jacob J. Neuman
BY
his ATTORNEY

Dec. 12, 1933.   J. J. NEUMAN   1,939,183
AUTOMATIC SEQUENCE CONTROL MEANS
Filed July 26, 1930   6 Sheets-Sheet 4

INVENTOR
Jacob J. Neuman
BY
his ATTORNEY

Dec. 12, 1933.  J. J. NEUMAN  1,939,183
AUTOMATIC SEQUENCE CONTROL MEANS
Filed July 26, 1930   6 Sheets-Sheet 5
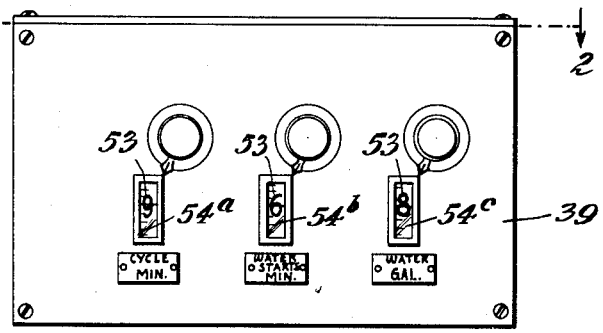
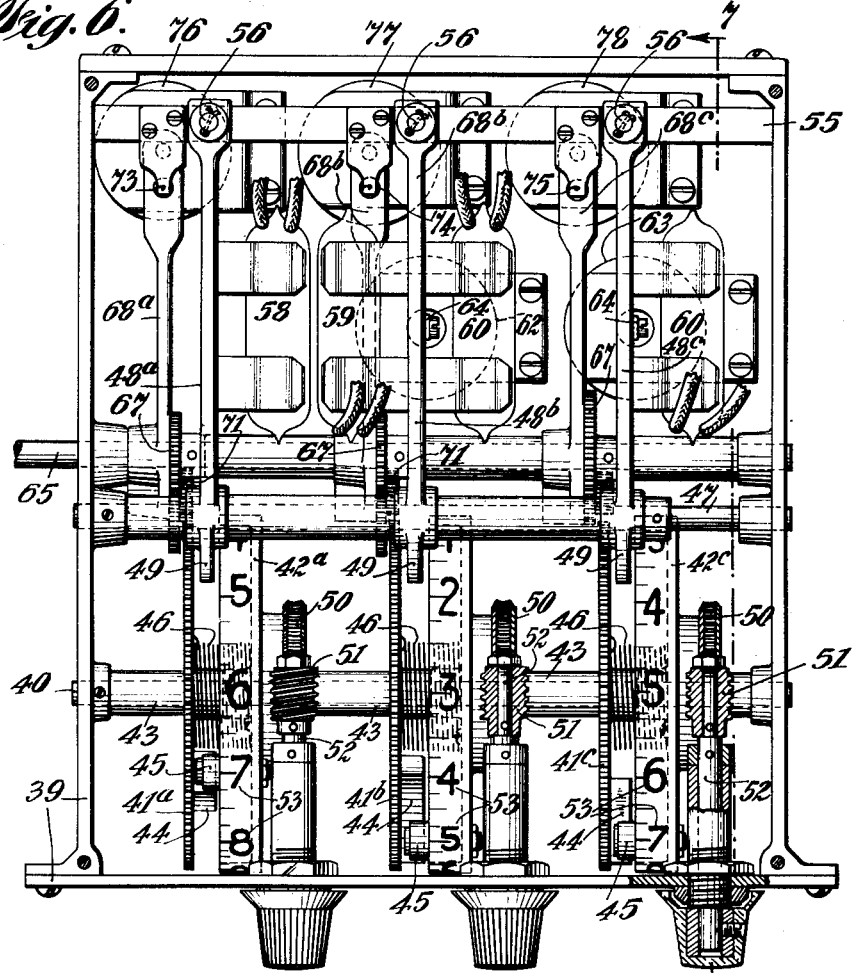
INVENTOR
Jacob J. Neuman
BY C. P. Goepel
his ATTORNEY Dec. 12, 1933.    J. J. NEUMAN    1,939,183
AUTOMATIC SEQUENCE CONTROL MEANS
Filed July 26, 1930    6 Sheets-Sheet 6

INVENTOR
Jacob J. Neuman
BY
his ATTORNEY

Patented Dec. 12, 1933

1,939,183

UNITED STATES PATENT OFFICE 1,939,183

AUTOMATIC SEQUENCE CONTROL MEANS

Jacob J. Neuman, New York, N. Y.

Application July 26, 1930. Serial No. 470,995

12 Claims. (Cl. 210—72)

This invention relates to automatic sequence control means, and has for its primary object and purpose to provide means whereby the frequently disastrous results of careless or inattentive manual control and operation of processing apparatus of various kinds may be obviated, and excessive waste and expense in the practice of various industrial processes eliminated.

It is a more particular object of my present invention to provide an automatic means of the above character which is particularly designed and intended for use in connection with industrial processes calling for very delicate control of the sequentially inaugurated steps or phases of the process, such for instance, as the processing of sugars wherein, it is of first importance to economical production of refined sugar of the higher grades, that the syrup or liquor shall be completely purged or separated from the sugar crystals while at the same time, dissolving of the crystals to any appreciable extent is avoided.

To the above end, it is an important object of my invention to provide an electrical control switch of the multiple unit type, the said units being relatively and independently adjustable and automatically operating to control the duration of the processing cycle, as well as the duration of the several phases or steps thereof in predetermined timed relation.

With the above and other objects in view, the invention consists in the improved automatic sequence control means for industrial processes, as will be hereinafter more fully described, illustrated in the accompanying drawings, and subsequently incorporated in the subjoined claims.

In the drawings, wherein I have disclosed one practical and efficiently operating embodiment of the invention and in which similar reference characters designate corresponding parts throughout the several views,—

Fig. 5 is a front elevation of one form of the multiple unit switch;

Fig. 6 is an enlarged top plan view thereof with the cover of the switch casing removed, and certain parts shown in section.

Figure 1:
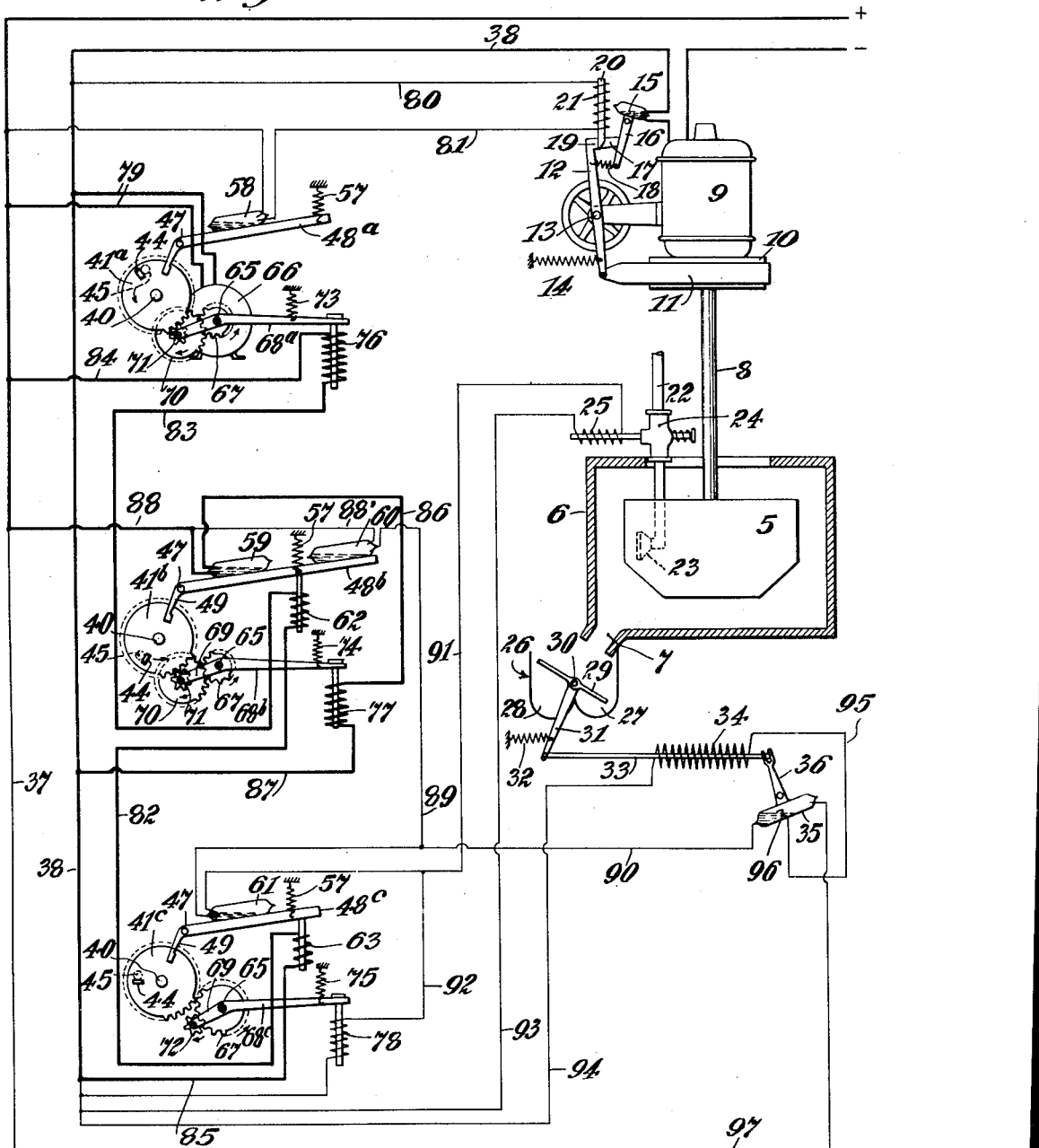
Figure 1 is a diagrammatic view showing the present invention as applied to the processing of sugars, and illustrating the condition of the apparatus and of the several units of the automatic control switch at the start of the operating cycle.

For the purpose of illustrating one practical application of the invention, in the accompanying drawings, I have illustrated the same as employed for the purpose of automatically controlling the processing of sugars. It will however, be understood as this description proceeds that insofar as the novel features of the improved multiple unit control switch are concerned, the same might also be utilized advantageously for the automatic control of various other industrial processes.

In processing sugars, at several stages of the process, it is necessary to separate the liquid from the solids. This is accomplished by means of centrifugal extractor machines and the time period during which the sugar is centrifugally spun in such machines, is an important factor in the processing of high grade sugars. If the sugar is spun for too long a time in the centrifugal machine, it will cake or harden, and considerable labor is required to remove the same. In addition to the fact that in the efforts to effect such removal of the hardened sugar, the same may be deleteriously effected resulting in a low grade product, the centrifugal machine itself may possibly be damaged. On the other hand, if the sugar is not spun for a sufficient length of time in the centrifugal machine, the liquor will not be completely separated from the sugar crystals thereby also resulting in the production of a low grade product. Thus, it is apparent that the duration of the process cycle or the time during which the centrifugal machine operates upon each charge of sugar, is of first importance.

Secondly, it is also highly important in the washing of the liquor or syrup from the sugar crystals, that the time of application of the washing liquid with respect to the start of the cycle shall be exactly controlled. If the wash water is applied too soon, it merely dilutes the liquor and passes off with it, while if it is applied too late, there will be insufficient time for the wash water to completely remove or separate the liquor or syrup from the sugar.

Thirdly, it is also necessary that the wash water be applied to the sugar in definite and exact quantity or volume. If too little water is applied, it will be insufficient to thoroughly wash off the liquor or syrup from the sugar crystals, while if too much is applied, it will result in dissolution of the crystals. Both of these conditions are highly undesirable.

Fourthly, it is sometimes advisable to shift the separated syrup or liquor during and after the washing period to a separate holder or container, because the liquor at this stage of the process will give a higher test of sugar due to dissolving of the sugar grains or crystals, which may be subsequently re-crystallized by further processing.

Referring now to the accompanying drawings, in the several diagrammatic views, I have illustrated a conventional form of centrifugal extractor embodying the usual foraminous rotary basket 5 within the housing or curb 6, said housing at its bottom having a conveniently located outlet 7. The basket 5 is suitably fixed to the lower end of the vertical shaft 8 driven by the electric motor 9. The motor shaft is provided with a suitable type of brake, herein conventionally indicated as consisting of the drum or wheel 10 fixed on the motor shaft to be frictionally engaged by the brake band 11. One end of this brake band is connected to the lower end of a vertically positioned lever 12 fulcrumed intermediate of its ends as at 13, a coil spring 14 being connected with the lower end of the lever to move the same in a direction to apply the brake. An oscillatable mercury switch shown at 15 has an arm 16 engaged by a lateral projection 17 on the upper end of the lever 12, said arm being held in contact with said projection by means of the coil spring 18. The projection 17 is provided with a shoulder on one side thereof as at 19 for engagement by the lower end of the core 20 of a solenoid type trip magnet 21.

A water supply pipe 22 extends downwardly through the top of the housing 6 and has a suitable nozzle 23 on its lower end positioned within the basket 5. A normally closed valve 24 is interposed in the supply pipe 22 and is operated to open position by energization of the solenoid 25.

Below the outlet 7 of the housing 6 a receiving trough for the sugar liquor and wash water, generally indicated at 26 is arranged, the said trough having the two channels 27 and 28 respectively. Between these channels and beneath the outlet 7 an oscillatable directing plate 29 is pivotally mounted as at 30 and to the pivot axis of said plate beyond one end of said trough, the downwardly extending arm 31 is fixed. This arm and the plate 29 are yieldingly held in the normal position shown in Fig. 1 of the drawings by the coil spring 32. To the lower end of the arm 31 one end of a rod 33 is pivotally connected, said rod being connected with or constituting an extension of the core of a solenoid 34. The other end of said rod is operatively connected with the upper end of the arm 36 of an oscillatable mercury switch 35.

Figure 2:
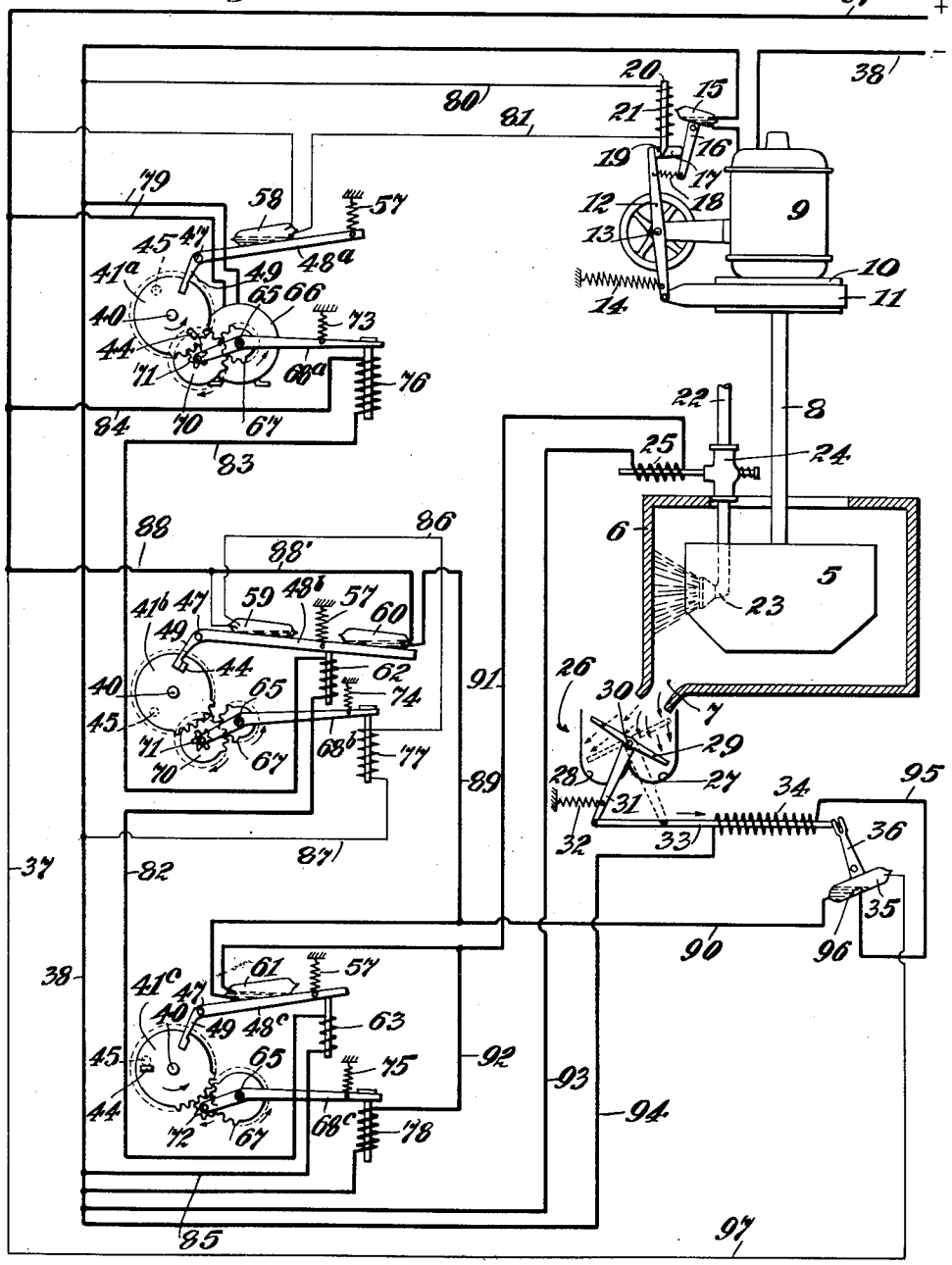
Fig. 2 is a similar view showing the condition of the several switch units, at the start of the washing phase or step of the process.
Figure 3:
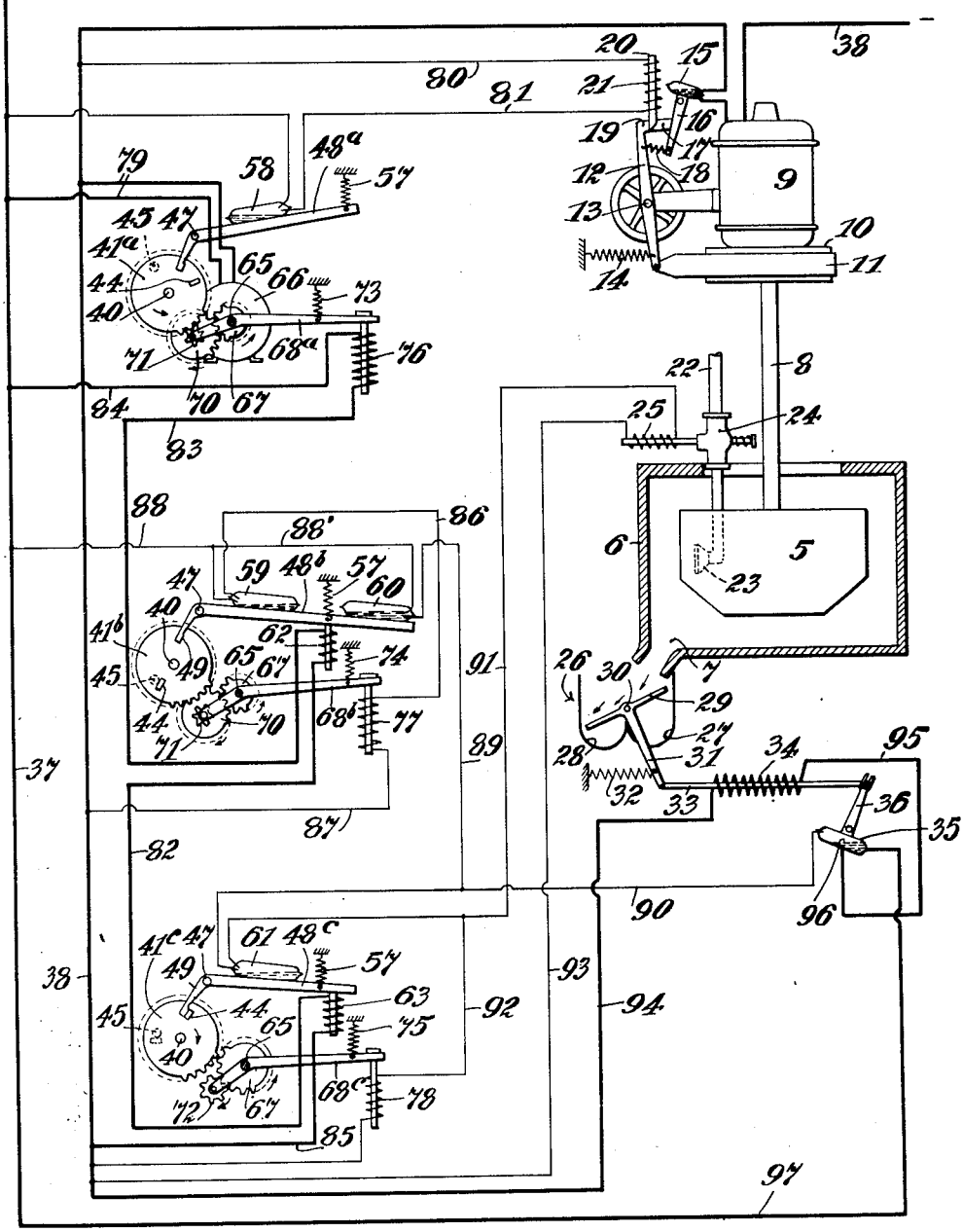
Fig. 3 is a similar diagrammatic view showing the condition of the several switch units at the end of the washing step.

The positive and negative electric current feed lines for the motor 9 are indicated at 37 and 38 respectively, the mercury switch 15 being interposed in the negative side of the circuit, the said switch being in closed position when the trip magnet core 20 is engaged with lever 12 to hold the brake band 11 in the released position as shown in Figs. 1, 2 and 3. The energization of the several solenoid magnets 21, 25 and 34, is automatically controlled so that the parts of the apparatus actuated by said solenoids will operate in properly timed relation to each other by my improved multiple unit switch, which will now be described in detail.

Figure 7:
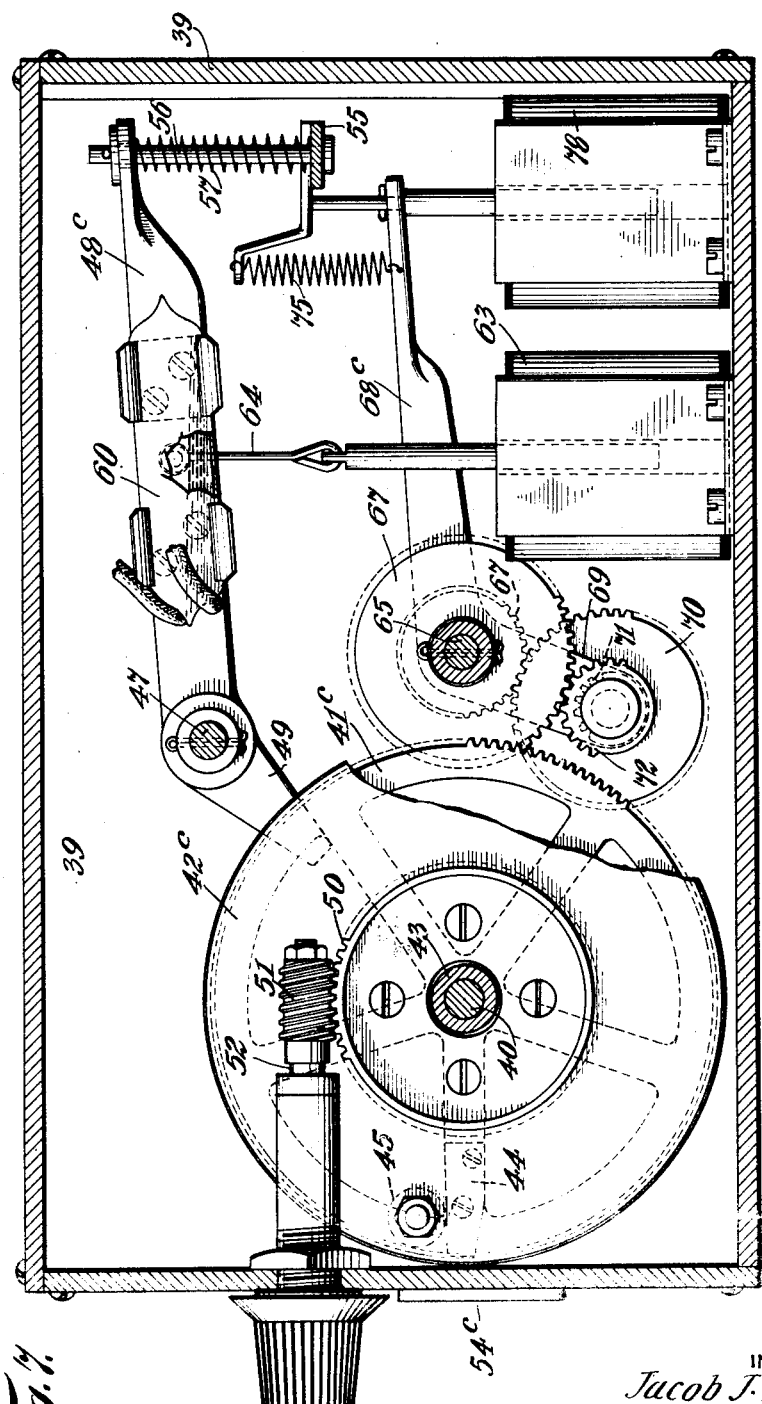
Fig. 7 is a vertical sectional view taken on the line 7—7 of Fig. 6.

Referring more particularly to Figs. 5, 6 and 7 of the drawings, the various switch parts are operatively mounted and arranged within a single housing or casing generally indicated at 39. Adjacent to the front end of this casing, a transversely positioned shaft 40 is fixed in the opposite side walls thereof and upon this shaft a plurality of large gears 41$^a$, 41$^b$ and 41$^c$ (in the present instance three) are loosely mounted for independent rotation. There is also associated with each of these gears at one side thereof, and likewise loosely mounted on the rod 40, a dial 42$^a$, 42$^b$ and 42$^c$, respectively. The gears are spaced from each other and from the associated dials by suitable spacing sleeves 43 on the rod 40. To one side of each gear, a detent lug 44 is suitably fixed and is adapted for engagement with a stop 45 projecting from the opposed side of the associated dial, thus limiting the rotation of the individual gears to their normal positions under the action of the springs shown at 46.

In spaced relation to the rod 40, a second transverse rod 47 is supported in the opposite sides of the switch case and upon this rod the spaced levers 48$^a$, 48$^b$ and 48$^c$ are loosely mounted for pivotal rocking movement. Each of these levers has an angular downwardly projecting arm 49 at its pivoted end which is disposed in the path of movement of the detent lug 44 carried by one of the gears 41$^a$, 41$^b$ or 41$^c$.

The dials 42$^a$, 42$^b$ and 42$^c$ are adapted to be independently adjusted relative to the gears with which they are respectively associated to position the respective stops 45 relative to the lever arms 49, and as herein shown, such adjustment may be most conveniently effected by providing each dial with a worm gear 50 engaged by a worm 51 on the inner end of a manually adjustable shaft 52 suitably mounted in the front wall of the switch case 39. Each dial has a peripheral flange suitably graduated and provided with the spaced digits or numerals suitably marked thereon as shown at 53, and which are visible through the respective sight openings 54$^a$, 54$^b$ and 54$^c$ provided in the front wall of the case 39. The numerals on the dial 42$^a$ indicate the time period or duration of the process cycle, while the dial 42$^b$ indicates the number of minutes elapsing after the start of the cycle when the wash period begins, while the dial 42$^c$ indicates the quantity or volume of the wash water supplied in each operating cycle, in gallons. The appropriate indicative characterizations may be suitably associated with the respective sight openings of the switch case in any preferred manner.

In the rear end of the case 39 a transverse bar 55 is secured in which the vertical rods 56 are mounted, said rods extending loosely through openings in the rear ends of the levers 48$^a$, 48$^b$ and 48$^c$ respectively, and supporting the springs 57 yieldingly urging the rear ends of said levers upwardly to the normal position shown in Fig. 7 of the drawings. Each of these levers is provided with suitable mercury switch tube supporting clips, a single such switch 58 being mounted on the lever 48$^a$, while two mercury switches 59 and 60 respectively, are mounted on the lever 48$^b$, and a single such switch 61 is mounted on the lever 48$^c$. To each of the levers 48$^b$ and 48$^c$ respectively, the core of a solenoid magnet 62, 63 respectively, is connected by a link such as that shown at 64 in Fig. 7 of the drawings. These magnets are not of sufficient strength to pull the levers 48$^b$ and 48$^c$ downwardly when energized, but are merely holding magnets, which after the lever has been actuated, will hold the same in its actuated position until the magnet has been deenergized.

Rearwardly of the rod 47 and below the same, a shaft 65 is journalled in suitable bearings provided on the walls of the switch case, and is driven by means of an external electric motor indicated at 66. Upon this shaft there is fixed the spaced gears 67 and adjacent each of said gears a lever 68$^a$, 68$^b$ and 68$^c$ respectively, is loosely mounted on the shaft 65. Each of these levers has an angular end portion 69 extending downwardly below the shaft 65 and upon the same gearing is mounted for transmitting rotation from one of the gears on the shaft 65 to one of the gears 41$^a$, 41$^b$ or 41$^c$, as the case may be. For the purpose of driving the gears 41$^a$ and 41$^b$, I have shown on each of the levers 68$^a$ and 68$^b$, large gears 70 meshing with the two relatively small gears 67 on the shaft 65, and smaller gears 71 on the same axes with the gears 70 which are movable into and out of engagement with the gears 41$^a$ and 41$^b$. The other lever 68$^c$ carries a single rotation transmitting gear 72 of small diameter in constant mesh with the large diameter gear 67 on shaft 65. The gear elements of the several switch units are of such ratios as to transmit rotation to the several gears 41$^a$, 41$^b$ and 41$^c$ from the common drive shaft 65 at the proper predetermined relative speeds. The several levers 68$^a$, 68$^b$ and 68$^c$ are yieldingly held in their normal positions wherein the gears 41$^a$, 41$^b$ and 41$^c$ are disentrained from the drive shaft 65, by means of the springs 73, 74 and 75 respectively.

Additional solenoid magnets 76, 77 and 78 are arranged in the switch case 39 and have their cores respectively connected to the rear ends of levers 68$^a$, 68$^b$ and 68$^c$ so that when any one of these magnets is energized, the corresponding lever is rocked on shaft 65 to entrain said drive shaft with one of the gears 41$^a$, 41$^b$ and 41$^c$, as the case may be.

Referring now again to the diagram of Fig. 1 of the drawings, it will be seen that the field of motor 66 is connected by conductors 79 with the power feed lines 37 and 38 and the winding of the trip solenoid magnet 21 is connected with the feed lines through the conductors 80 and 81, said conductor 81 including spaced terminals of the mercury switch 58 and as seen in the drawings, in the normal position of lever 48$^a$, the mercury is out of contact with said terminals so that the circuit through the magnet coil is normally open. The windings of the holding magnets 62, 63 are connected by the conductor 82 and the winding of magnet 62 is also connected with the winding of magnet 76 by conductor 83. The circuit through these magnet windings is completed by connecting the winding of the magnet 76 through conductor 84 with the positive power line 37, while the winding of magnet 63 is connected by conductor 85 with the negative power line 38. In other words, the magnets 76, 62 and 63 are connected in series in the current circuit of motor 9.

One of the terminals of mercury switch 59 on lever 48$^b$ is connected through conductor 86 with the winding of magnet 77, the said winding being connected with the negative power line 38 by conductor 87. The other terminal of the switch 59 is connected by conductor 88 with the positive line wire 37. It will be noted that this switch 59 is normally closed. The other normally open switch 60 on lever 48$^b$ is also connected with the positive current supply line 37 by conductor 88', while the other terminal of said switch is connected through conductors 89 and 90 with one terminal of the switch 61 on lever 48$^c$ and with one terminal of the oscillatory switch 35. The other terminal of switch 61 is connected by conductor 91 with the winding of the valve operating solenoid magnet 25, to which conductor the winding of magnet 78 is connected as indicated at 92, the said magnet winding being connected through conductor 93 with the negative current supply line 38. Conductors 93 and 94 also connect the negative side of the power supply line with the electro-magnets 25 and 34, the winding of the latter magnet being connected by conductor 95 to a central terminal 96 of the mercury switch 35, while the other end terminal of said switch opposite to that to which conductor 90 is connected, is connected with the positive side of the current supply circuit by conductor 97.

Figure 4:
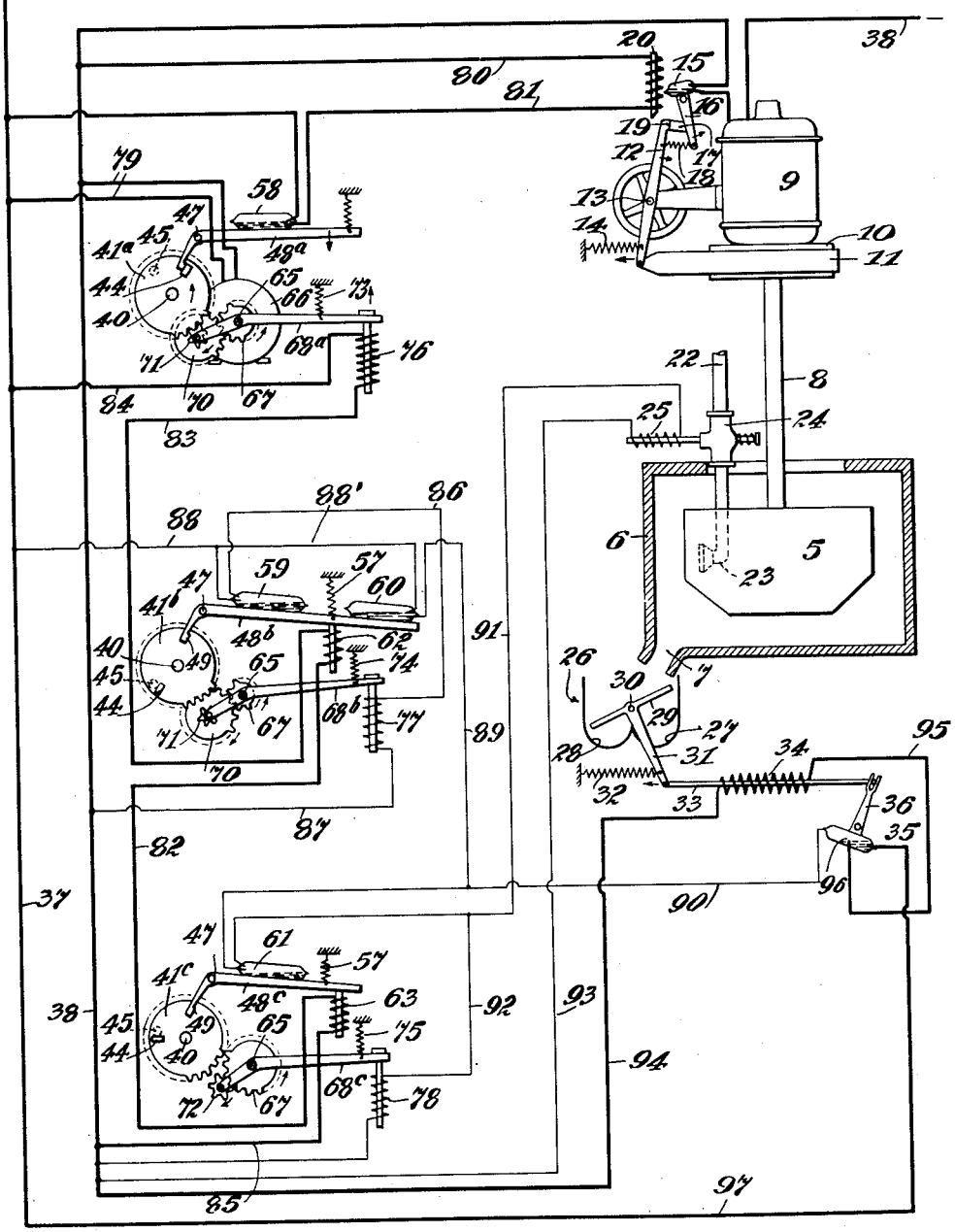
Fig. 4 is a similar diagrammatic view showing the condition of the several switch units at the end of the process cycle after the operation of the apparatus has stopped.

In the operation of the invention as above described, the several dials 42$^a$, 42$^b$ and 42$^c$ are first adjusted by operation of the shafts 52 to position their stops 45 in proper relation to the ends of the levers 48$^a$, 48$^b$ and 48$^c$ as will be indicated by the dial readings. Thus before starting operations, it will be understood that the springs 46 hold the several detents 44 carried by the gears in contact with these stops. When the power switch is now closed to supply current through the lines 37 and 38, the motors 9 and 66 are simultaneously started in operation. This closing of the main power circuit also energizes the solenoid magnets 76, 77, 62 and 63. The energization of magnets 76 and 77 thus entrains gears 41$^a$ and 41$^b$ with the motor driven shaft 65 by pulling the rear ends of the levers 68$^a$ and 68$^b$ downwardly. The magnets 62 and 63 however, being relatively weak, are incapable of disturbing the normal positions of the levers 48$^b$ and 48$^c$. As the gear 41$^b$ is thus rotated during the first portion of the operating cycle, and after the sugar has been spun in the centrifugal machine for the definitely predetermined length of time, the detent 44 on said gear comes into contact with the end of lever 48$^b$ and moves this lever from the position shown in Fig. 1 of the drawings to the position of Fig. 2. In this movement of the lever, the normally closed switch 59 is caused to break the circuit through the connection 86 with electro-magnet 77, thereby deenergizing this magnet so that gear 41$^b$ is disentrained from the shaft of motor 66. At the same time, the normally open mercury switch 60 is caused to close the circuit through conductors 37, 88, 88', 89, and 90, normally closed mercury switch 61, and conductors 91 and 93 to the winding of the valve operating magnet 25. This valve is therefore, moved to open position so that water is sprayed upon the sugar from the nozzle 23. When the switch 60 is thus closed, it also closes the circuit through switch 61 conductors 92 and 83 of the solenoid magnet 78, thereby entraining the gear 41$^c$ with the driven shaft 65. During the continuance of rotation of this gear, the washing operation continues. Also, when the circuit is closed through mercury switch 60, the solenoid 34 is energized through the closed mercury switch 61, conductors 90 and 95 connected with spaced terminals of the mercury switch 35 and through conductor 94. This energization of the solenoid 34, shifts the directing plate 29 from the position of Fig. 1 to the position shown in Fig. 3. The switch 35 will of course, thereby be oscillated, but the mercury switch will then close the contact between the central terminal 96 and the other of the end terminals of the mercury switch thereby maintaining the solenoid circuit closed through the conductor 97 independently of the mercury switch 61 on the lever 48°, as seen in Fig. 3 of the drawings. Also as shown in Fig. 3, when the detent 44 on the gear 41° finally strikes the end of the lever 68°, the circuit between the terminals of the mercury switch 61 is broken, thereby deenergizing the valve solenoid magnet 25, when said valve closes and the washing step of the process stops. The opening of the circuit through mercury switch 61 of course, also deenergizes the magnet 78 so that gear 41° is disentrained from the shaft 65. The holding magnets 62 and 63 however, continue to retain the levers 48ᵇ and 48° in their operated positions, until as shown in Fig. 4 of the drawings, the detent on gear 41ᵃ comes into contact with lever 48ᵃ. This movement of said lever, closes the circuit through the mercury switch 58 thereon, thus energizing the trip magnet 21 and disengaging its core from the end of the lever 12 so that spring 14 will act to simultaneously apply the brake of the centrifugal extractor, and also oscillate mercury switch 15, thus breaking the circuit through the negative side of the power supply line and discontinuing further operation of the motors 9 and 66. The holding magnets 62 and 63 are of course, also deenergized so that levers 48ᵇ and 48° as well as the lever 48ᵃ return to their normal positions. This completes the cycle of operation.

During and after the washing phase of the cycle, it will be evident that the discharge through the outlet 7 of the centrifugal extractor is directed into the channel 28 of trough 26 from which it is collected in a suitable container, and after the cycle has been completed and the plate 29 returned to normal position upon deenergization of the solenoid 34, any further discharge from the centrifugal machine will be directed into the other channel 27 of the trough. This latter material, however, is of relatively low sugar content.

From the foregoing description considered in connection with the accompanying drawings, it will be seen that I have devised an automatic sequence control means for processing of sugar and other industrial operations, which, while of comparatively simple construction, will be very positive and reliable in practical operation. The multiple unit switch as above described is capable of easy and quick adjustment and is sensitive and reliable in operation to insure the inauguration and discontinuance of the several steps of the process cycle with a high degree of accuracy and at the proper times in accordance with the predetermined requirements of the particular process. The parts of this switch are also of comparatively simple form and compact in their arrangement so that the entire apparatus, together with the wiring will require but little space in practical use.

While I have herein shown and described one simple and satisfactory embodiment of the invention, it will be understood that with respect to the particular construction and arrangement of the various mechanical parts, the essential features of my present improvements are susceptible of embodiment in various other structural forms. Accordingly, the privilege is reserved of resorting to all such legitimate modifications therein as may be fairly embodied within the spirit and scope of the invention as claimed.

I claim:

1. In combination with processing apparatus having means for subjecting material to a plurality of process steps, means for automatically controlling the duration of the process cycle and the sequential inauguration and discontinuance of the several process steps, said control means including a series of independently acting units, a common operating means therefor, independently operable means individual to the respective units for connecting the same with said operating means, and a common source of power governing the operation of said apparatus and the control means.

2. In combination with processing apparatus having means for subjecting material to a plurality of process steps, means for automatically controlling the duration of the process cycle and the sequential inauguration and discontinuance of the several process steps, said control means including a series of independently acting units, a common operating means therefor, independently operable means individual to the respective units for connecting the same with said operating means, each unit having a manually adjustable part for predetermining the time of effective operation of the unit with respect to each of the other units to thereby regulate the time period of duration of the process cycle and of the several process steps, and automatically operable means governing the operation of said apparatus and the control means.

3. In combination with processing apparatus having means for subjecting material to a plurality of process steps and an electrical operating motor therefor, automatically operating devices energized from the motor current supply circuit to make and break the motor circuit and effect the sequential inauguration and discontinuance of the several process steps in timed relation to each other, a common operating motor for said devices, and electrically controlled means associated with each of said devices for operatively connecting the same with said motor at predetermined times during the process cycle.

4. In combination with sugar processing apparatus including a rotary sugar container and operating motor therefor, and fluid spraying means cooperating with the container; means for controlling the rotation of the container including a switch in the motor current supply circuit, an electrically operated device for controlling movement of said switch to its open position, said device comprising an adjustable part predetermining the time period of operation of said motor, an electrically operated timing device energized upon the closing of the motor circuit for automatically inaugurating the start of the fluid spray after a predetermined rotation of the container, a second timing device electrically connected with said first timing device and operable to automatically stop the spray of fluid after a time period of rotation of the container, means for controlling the discharge flow of syrup and wash liquid from the container during a part of the process cycle, switch means for automatically actuating said control means electrically connected with each of said timing devices, and a shunt connecting said switch means in the main motor circuit, after the second-named timing device has operated to stop the fluid spray to thereby maintain said discharge control means in its operated position.

5. In combination with sugar refining apparatus having a rotary container, an operating motor therefor and fluid spraying means cooperating with the container; an electrically operated timing device energized upon the closing of the motor circuit and operating to automatically inaugurate the start of the fluid spray after a predetermined rotation of the container, a second timing device synchronously operable with said first timing device to automatically stop the spray of fluid after a further period of rotation of the container, means electrically interconnected with each of said timing devices for controlling the discharge flow of syrup and wash liquid from the container during the operating cycle, and a shunt circuit connecting said control means in the main motor circuit after the second named timing device has operated to stop the fluid spray, to thereby maintain said discharge control means in its operated position.

6. In combination with processing apparatus having a plurality of members operable to control different steps of the process, separate actuating means for said members, a corresponding number of independently operable devices each having means for controlling the effective operation of one of said actuating means and with one of said operable devices controlling a plurality of said actuating means, and means for operating said devices in predetermined timed relation to each other.

7. In combination with processing apparatus having a plurality of members operable to control different steps of the process, separate actuating means for said members, a corresponding number of independently operable devices each having means for controlling the effective operation of each of said actuating means, a common operating motor for said devices, and separate independently operable means for establishing an operative connection between said motor and the respective devices at relatively different times.

8. In combination with processing apparatus having a plurality of members operable to control different steps of the process, electrically controlled actuating means for each of said members, a circuit therefor, independently operable switches connected in series in said circuit, one of said switches being normally open and the other normally closed, and means for operating said switches at relatively different times to first close the normally open switch and simultaneously actuate both of said members and thereafter open the normally closed switch to break said circuit.

9. In combination with processing apparatus having a plurality of members operable to control different steps of the process, electrically controlled actuating means for each of said members, a circuit therefor, independently operable switches connected in series in said circuit, one of said switches being normally open and the other normally closed, means for operating said switches at relatively different times to first close the normally open switch and simultaneously actuate both of said members and thereafter open the normally closed switch to break said circuit, and means for preventing restoration of the actuating means for one of said members to normal condition during a further period of the process cycle.

10. In combination with processing apparatus having a plurality of members operable to control different steps of the process, separate actuating means for said members, a corresponding number of independently operable devices each having means for controlling the effective operation of each of said actuating means, and separate normally idle power transmission means for establishing an operative connection between the respective devices and a source of power at relatively different times.

11. In combination with processing apparatus having a movable member operable to control a step of the process, electrically controlled actuating means for said member, a circuit therefor, independently operable switches connected in series in said circuit, one of said switches being normally open and the other normally closed, means for operating said switches at relatively different times to first close the normally open switch and actuate said member, and thereafter open the normally closed switch to break said circuit, and additional means preventing restoration of the actuating means for said member to normal condition during a further period of the process cycle.

12. In combination with processing apparatus having a movable member operable to control a step of the process, electrically controlled actuating means for said member, a circuit therefor, independently operable switches connected in series in said circuit, one of said switches being normally open and the other normally closed, means for operating said switches at relatively different times to first close the normally open switch and actuate said member, and thereafter open the normally closed switch to break said circuit, and a shunt circuit connecting said actuating means in the main circuit independently of the latter switch to prevent restoration of said means to normal condition during a further period of the process cycle.

JACOB J. NEUMAN.